US007068998B2

(12) United States Patent
Zavidniak

(10) Patent No.: US 7,068,998 B2
(45) Date of Patent: Jun. 27, 2006

(54) METHODOLOGY FOR THE DETECTION OF INTRUSION INTO RADIO FREQUENCY (RF) BASED NETWORKS INCLUDING TACTICAL DATA LINKS AND THE TACTICAL INTERNET

(75) Inventor: Paul M. Zavidniak, San Diego, CA (US)

(73) Assignee: Northrop Grumman Corp., Los Angeles, CA (US)

( * ) Notice: Subject to any disclaimer, the term of this patent is extended or adjusted under 35 U.S.C. 154(b) by 568 days.

(21) Appl. No.: 09/833,634

(22) Filed: Apr. 13, 2001

(65) Prior Publication Data

US 2002/0197978 A1    Dec. 26, 2002

(51) Int. Cl.
H04M 1/66    (2006.01)

(52) U.S. Cl. .................. 455/410; 455/411; 726/22; 726/23

(58) Field of Classification Search ........ 455/410–411, 455/414.1, 423, 67.11; 380/270; 713/200–201; 726/25

See application file for complete search history.

(56) References Cited

U.S. PATENT DOCUMENTS

| 5,005,210 | A | * | 4/1991 | Ferrell ..................... 455/115.1 |
|---|---|---|---|---|
| 5,278,901 | A | | 1/1994 | Shiuh-Pyung et al. ......... 380/4 |
| 5,557,742 | A | | 9/1996 | Smaha et al. ................ 395/186 |
| 5,621,889 | A | | 4/1997 | Lermuzeaux et al. ........ 395/186 |
| 5,758,277 | A | | 5/1998 | Hawkes ....................... 455/410 |
| 5,761,429 | A | | 6/1998 | Thompson .............. 395/200.54 |
| 5,796,942 | A | | 8/1998 | Esbensen ................ 395/187.01 |
| 5,950,110 | A | | 9/1999 | Hendrickson ................... 455/1 |
| 5,956,635 | A | | 9/1999 | Hoogerwerf et al. ........ 455/411 |
| 5,978,669 | A | | 11/1999 | Sanmugam .................. 455/410 |
| 5,991,881 | A | | 11/1999 | Conklin et al. ............. 713/201 |
| 6,026,442 | A | | 2/2000 | Lundy et al. ................ 709/229 |
| 6,073,006 | A | * | 6/2000 | Sawyer et al. .............. 455/410 |
| 6,104,922 | A | * | 8/2000 | Baumann ..................... 455/410 |
| 6,279,113 | B1 | * | 8/2001 | Vaidya ........................ 713/201 |
| 6,321,338 | B1 | * | 11/2001 | Porras et al. ................ 713/201 |
| 6,408,391 | B1 | * | 6/2002 | Huff et al. ................... 713/201 |
| 6,442,694 | B1 | * | 8/2002 | Bergman et al. .............. 726/22 |
| 6,654,882 | B1 | * | 11/2003 | Froutan et al. ............. 713/153 |
| 6,765,498 | B1 | * | 7/2004 | Sabatino ..................... 340/945 |
| 6,772,349 | B1 | * | 8/2004 | Martin et al. ............... 713/201 |
| 6,789,202 | B1 | * | 9/2004 | Ko et al. ..................... 713/201 |
| 2003/0037237 | A1 | * | 2/2003 | Abgrall et al. .............. 713/166 |

FOREIGN PATENT DOCUMENTS

GB    2333672 A    *    7/1999

* cited by examiner

*Primary Examiner*—William Trost
*Assistant Examiner*—Brandon J. Miller
(74) *Attorney, Agent, or Firm*—Buchanan Ingersoll PC

(57) ABSTRACT

The present invention provides strategies for detecting intrusions in wireless environments, and the strategies are based on innovative applications of information analysis as well as other information correlating techniques. The key to detecting intrusions in a RF based environment is to understand the normal spectrum of behavior so that deviations can be detected and analyzed. For a wireless communications grid, this process requires empirical knowledge about how the radios work together as components of the information grid, and how this grid network is managed. Once normal behavior has been characterized, anomalous behavior can be identified. Potential intrusions into the wireless network can be analyzed and an attack model can be created. The attack model can be utilized as the basis for initiating appropriate adaptive responses.

23 Claims, 4 Drawing Sheets

METHODOLOGY FOR THE DETECTION OF INTRUSION INTO RADIO FREQUENCY (RF) BASED NETWORKS INCLUDING TACTICAL DATA LINKS AND THE TACTICAL INTERNET

FIELD OF THE INVENTION

The present invention relates to the detection of intrusions, and more specifically the present invention relates to the detection of intrusions in wireless or radio frequency ("RF") networks including the Tactical Internet and tactical data links.

BACKGROUND OF THE INVENTION

Allies and adversaries alike have been moved by the pace of combat action in the Persian Gulf war, and by the total information dominance of the coalition forces over the Iraqi forces. Adversary threat analysis reveals that the Russians and Chinese have been particularly intrigued by aspects relating to command and control warfare and believe that to win on the battlefield it is first necessary to win the battle of the airwaves. Each country has crafted future warfighting plans which feature disruption of the adversary's command and control channels by penetrating classified communications networks, falsifying radio traffic and denying radio services using a variety of techniques. Governments are now trying to develop programs that address this new and very real threat to RF based military communications networks.

Although the survivability of communications networksCprimarily represented by the InternetChas benefitted from significant DoD and commercial research and development (R&D), the same cannot be said for wireless networks, tactical communications networks, or tactical datalinks. Moreover, as dependence on information systems and the infrastructure supporting them increases, however, so too does our vulnerability. In light of the global acceptance of the Internet, and in recognition of its associated vulnerabilities, many new companies have been formed to offer mitigating solutions to the vulnerability dilemma. As a result, there is an abundance of intrusion detection systems for wire based Internet connections and wired based networks, however, there are no solutions that would extend such a capability to the military=s wireless communications grid. Consequently, our deployed military personnel have not been afforded the level of protection currently available to the commercial Internet user who connects to the Internet via a wired connection. This deficiency has not escaped the notice of our adversaries, who have expressed their intent to exploit this weakness through jamming, falsification of commands and reports, corruption of data, communications mimicking, and altering of friendly traffic volumes. In fact, there are no known wireless intrusion detection programs that can provide the basis for assuring the survivability of future military communication systems, such as the Joint Tactical Radio System ("JTRS").

This threat extends to the Tactical Internet (which is a limited version of the Internet specially adapted for use by military units in the field), as well as to the wireless commercial Internet. Through the past ten years the wide acceptance of the Internet and the technologies that support it have dramatically altered business processes, and the Internet has ushered in an entirely new generation of electronic commerce businesses. Heretofore, many businesses have relied on manpower and voice telephones as the principal means to distribute information to a geographically distributed population. As a result of low-cost high-power computing and the Internet revolution, many businesses (most notably consumer lending institutions, travel agents, and retail outlets) have reengineered themselves to distribute information electronically over the Internet and over wireless links to the Internet. Given the inherent advantages of high-speed data networks over manpower intensive processes this methodology for knowledge distribution is especially efficient for the distribution of time sensitive information. Today, time sensitive information is available 24 hours a day, 7 days a week, anywhere in the world. All that is required is a home computer and a connection to the Internet. Increasingly, the connection to the Internet is via wireless links.

Traditionally, the Department of Defense ("DoD") has relied on man-in-the-loop systems to distribute time sensitive information (via radio) to its units deployed in the field. Following the general mode established by commercial industry, the military has sought to realize the capabilities of the Internet as a preferred means to distribute their own form of time-critical information (situation assessment, maneuver control, surveillance data). However, the military usually conducts its operations on the move and the fixed cable infrastructure of the telecommunications grid is not conducive to mobile operations. Accordingly, the military has extended some of the capabilities of the Internet over RF waveforms using its existing radio resources. To meet this requirement, the "Wireless Communications Grid", also known as the Tactical Internet ("TI"), architecture was developed. In this architecture, two existing RF systems were integrated together to provide limited Internet services to the military. The two systems include the Enhanced Position Locating Radio System ("EPLRS") that acts as the Internet infrastructure and the Single Channel Ground and Airborne Radio System ("SINCGARS") that provides connectivity between the user and the Internet infrastructure.

Throughout the U.S. military the total number of EPLRS radios service-wide are in the tens of thousands and the SINCGARS radios service-wide are in the hundreds of thousands. The military also utilizes a number of RF based tactical data links such as the Link-11 and the Link-16. An objective of the present invention, therefore, is to produce profound Information Warfare (IW) survivability of these existing RF networks, while embracing the transition into next generation radio systems as represented by the Joint Tactical Radio System.

The present invention addresses all these problems and can be scaled across the entire tactical wireless environment. The present invention, however, does not simply apply threat-specific or >point=solutions useful in the commercial Internet Protocol ("IP") environment to the wireless environment. Instead, the present invention provides a unique and novel solution to the special problems associated with wireless networks in general and tactical wireless networks in particular.

SUMMARY OF THE INVENTION

The present invention is directed towards a solid comprehension of wireless network behavior through network management. The network management data forms the basis for determining "normal" behavior, and subsequently, for identifying "anomalous" events. The advantage of this approach is that in the tactical RF environment this information is at least partially represented already in the form of operational program alerts (also known as operator alerts) that are monitored at forward-deployed network control stations in the Tactical Internet or at network monitoring or managmentmentmanagement systems in the case of RF based tactical data links. Typically, these "anomalous" events represent either "normal" errors, "quality of service" errors, potentially "suspicious" activity, or all. In the present invention, it is the association of anomalous events to each other through time and across space—against the background of known "normal" behavior characterized by user and temporal patterns—that forms the basis for identifying intrusions. Once intrusion is identified, tactics and techniques from the IP environment can be integrated into the wireless environment.

The present invention includes wireless-based intrusion awareness techniques, and it is not radio specific, since it embraces future software radios being developed by the military. The present invention also preferably includes effective recovery capabilities that can be designed in, not installed after the fact. The comprehensive IW threat to both the data (e.g. the message set) and the signal carrier environment should be addressed. The objectives of the present invention include identifying criteria necessary to detect intrusions in military communications networks; developing an attack model based on the analysis of these "suspicious" events; and finally developing a recovery model that incorporates a range of dynamically adaptive options available for sustaining communications during the attack. Using a proactive identification of triggering events and subsequent identification of a range of defensive counteractions will enhance information resiliency in both military and commercial environments.

DETAILED DESCRIPTION OF THE INVENTION

The present invention is based upon the establishment of normal network activity to include (temporal and user patterns) and the identification and documentation of errant or seemingly anomalous behavior sets (e.g. network events that negatively impact performance of the network) occurring on the Tactical Internet or on a RF based tactical data link. Such events, which are typically assumed to occur as a consequence of atmospheric conditions, equipment malfunction, equipment misconfiguration, equipment failure, operator error, or formatting errors, may be found to represent manifestations of hostile intrusion events (to include radio electronic combat). Should such events coincide with anomalous user patterns as well, then a higher fidelity assessment may be reached.

The Tactical Internet

Figure 1:
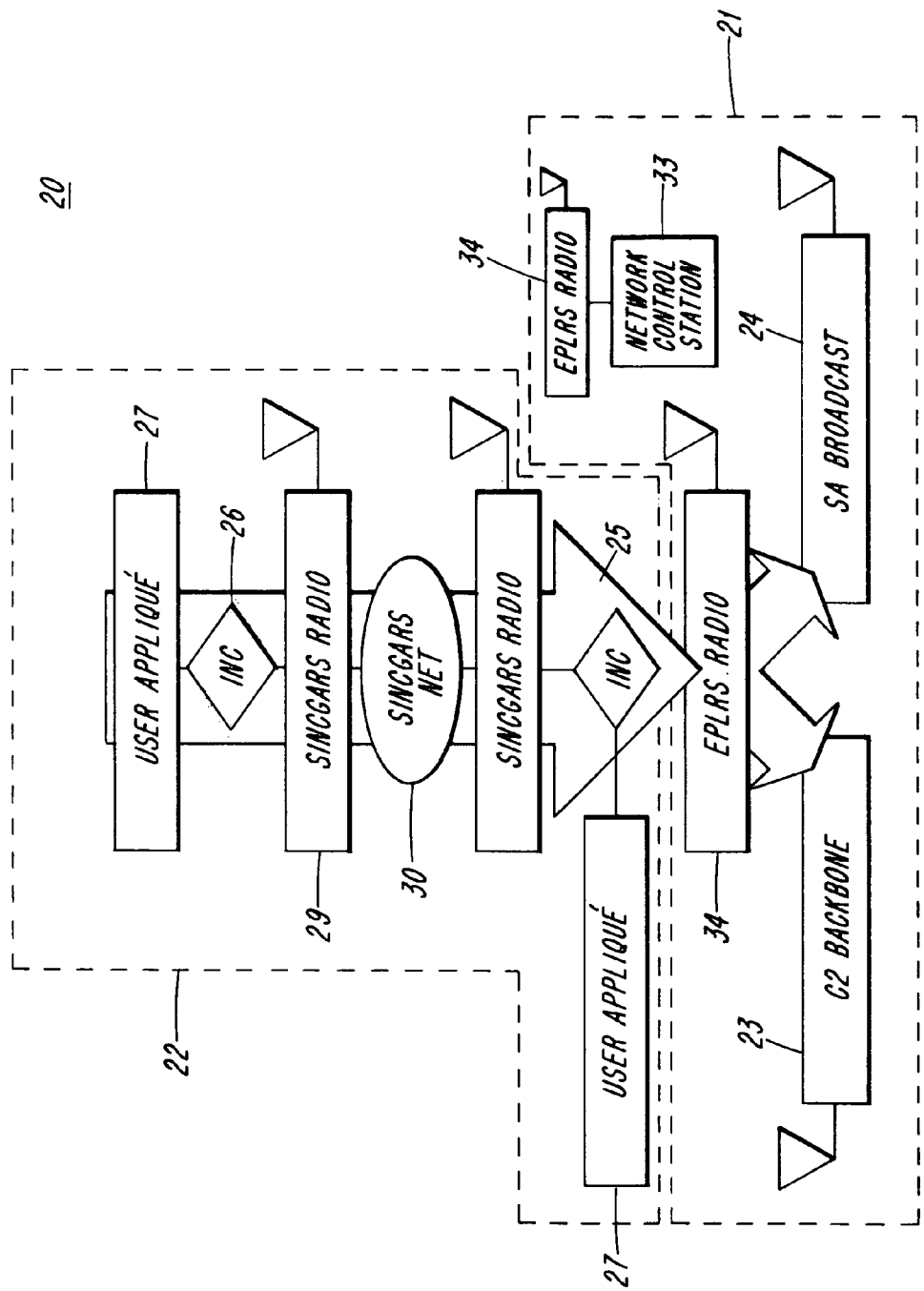
FIG. 1 is a diagram of a tactical communications grid as represented by the Tactical Internet.

Referring now to FIG. 1, a tactical communications grid 20, as represented by the Tactical Internet ("TI") is depicted. The tactical communications grid 20, consists of trunk (or carrier) services supported by a data system known as the Enhanced Position Locating Reporting System ("EPLRS") 21 and end-user services supported by a voice system such as the one known as the Single-Channel Ground and Airborne Radio System ("SINCGARS") 22. The military established the tactical communications grid 20 of FIG. 1 by marrying the two existing EPLRS 21 and SINCGARS 22 RF systems together with a user applique 27 and an Internet network controller ("INC") 26. The military realized that the existing SINCGARS voice system 22 commonly used by military personnel for voice traffic could be interfaced to the existing EPLRS data system 21, if military personnel had the means to generate and send data messages over the SINCGARS system 22 to the EPLRS system 23. The user applique 27, therefore, includes a keyboard, computer and monitor that are coupled to a SINCGARS radio 29, and the applique 27 allows military personnel to transmit IP data over an RF channel which is normally used for voice transmissions.

The Tactical Internet provides secure, jam-resistant, near real-time data communications support for Army applications including, but not limited to, Command and Control, Maneuver Control, Field Artillery Fire Control, Intelligence Assessment and distribution and Situation Assessment. EPLRS 21 is a Time Division Multiple Access ("TDMA") System using a frequency hopping, spread spectrum waveform in the UHF band. It incorporates internal COMSEC devices and has an Over The Air Rekeying ("OTAR") capability.

In addition to the EPLRS 21, the combat net radio component of the communications grid 20 may be designed around other separate radio systems, but the foremost of these is the SINCGARS 22 depicted in FIG. 1. The SINCGARS 22 is operated like the current VHF-FM radios, and it includes a plurality of SINCGARS radios 29. It provides access to the area common user network through the net radio interface system, or its range can be increased by retransmission. The use of the Internet Network Controller ("INC") 25 provides SINCGARS 22 access to the data communications grid 20. The INC 25 is basically an Internet Protocol ("IP") router, which provides for the range extension of packet data. The INC 25 performs switching and buffering of data inputs between computer hosts, SINCGARS 22, EPLRS 21, and other communication systems.

EPLRS 21 provides the carrier services of the Tactical Internet, since it is an existing data oriented network that already performs this role supporting non-Internet data distribution. In general, the EPLRS 21 network architecture supports the distribution of command and control that is often referred to as "C2"; situational awareness that is often referred to as "SA"; and position/navigation data across the battlefield. The EPLRS 21 has input to the C2 backbone 23 and SA broadcast 24. The EPLRS network architectural concept is typically configured to support an Army division's area of operations.

Figure 2:
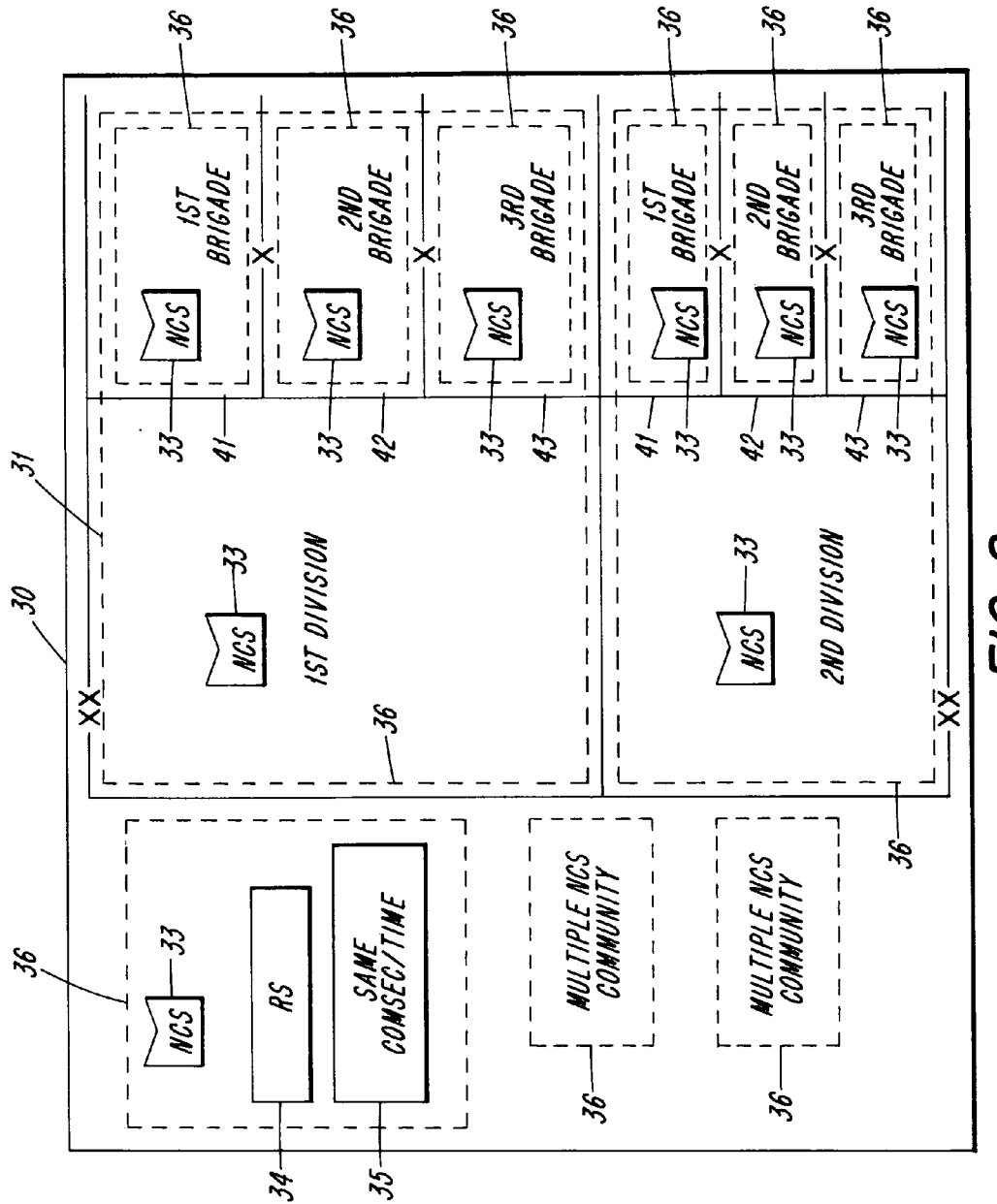
FIG. 2 is a skeletal block diagram that illustrates the area of operations of an Army corps having two U.S. Army divisions.

Referring now to FIG. 2, a block diagram illustrates the EPLRS 22 that is deployed to the corps area of operations 30 of an Army corps having two army divisions. As depicted in FIG. 2, the area of operation of a $1^{st}$ division is depicted by the rectangle 31, and the area of operation of a $2^{nd}$ division is depicted by the rectangle 32. Each Army division includes three brigades that are depicted as rectangles 41, 42, 43. Each of the EPLRS communities 36 dispersed throughout the corps area of operations 30 consists of a Network Control Station ("NCS") 33 and a plurality of radio sets ("RS") 34 (typically numbering approximately 250 per NCS), and they have their own synchronization and cryptographic keys 35. Each division's EPLRS network community 36 is made up of four NCS areas of responsibility. Gateways are employed to achieve communications between these communities. EPLRS 21 allows users to move between a division's EPLRS communities 36 while retaining system services.

As mentioned above, the combat net radio component of the communications grid 20 may be designed around three separate radio systems. Each system has different capabilities and transmission characteristics. These three systems include the Single-Channel Ground and Airborne Radio System ("SINCGARS") 22, Improved High Frequency Radio ("IHFR"), and Single-Channel Tactical Satellite ("TACSAT"). SINCGARS 22 replaces the manpack vehicular mounted VHF and airborne VHF frequency modulated radios. It accepts either digital or analog inputs and imposes the signal onto a frequency-hopping output signal. This hinders threat intercept and jamming units from locating or disrupting friendly communications. SINCGARS 22 is the primary means for short-range (less than 35 kilometers (22 miles)) secure voice command and control below division level.

SINCGARS 22 is operated like the existing VHF-FM radios. It provides access to the area common user network through the net radio interface system, or its range can be increased by retransmission. The Internet network controller ("INC") 25 provides SINCGARS 22 access to the communications grid 20. The INC 25 is basically an Internet Protocol ("IP") router, which provides for the range extension of packet data. The packet mode of INC 26 provides the means to route data to be sent to a member within the same operational net (intranetting) or SINCGARS net 30. The INC 25 acts as a gateway to route data to members outside the SINCGARS net 30 (internetting). The INC 25 performs switching and buffering of data inputs between computer hosts, SINCGARS 22, EPLRS 21, and other communication systems. FIG. 1 illustrates the integration of the SINCGARS system 22 having a plurality of SINCGARS radios 29 and a SINCGAR net into the EPLRS 21 backbone.

Figure 3:
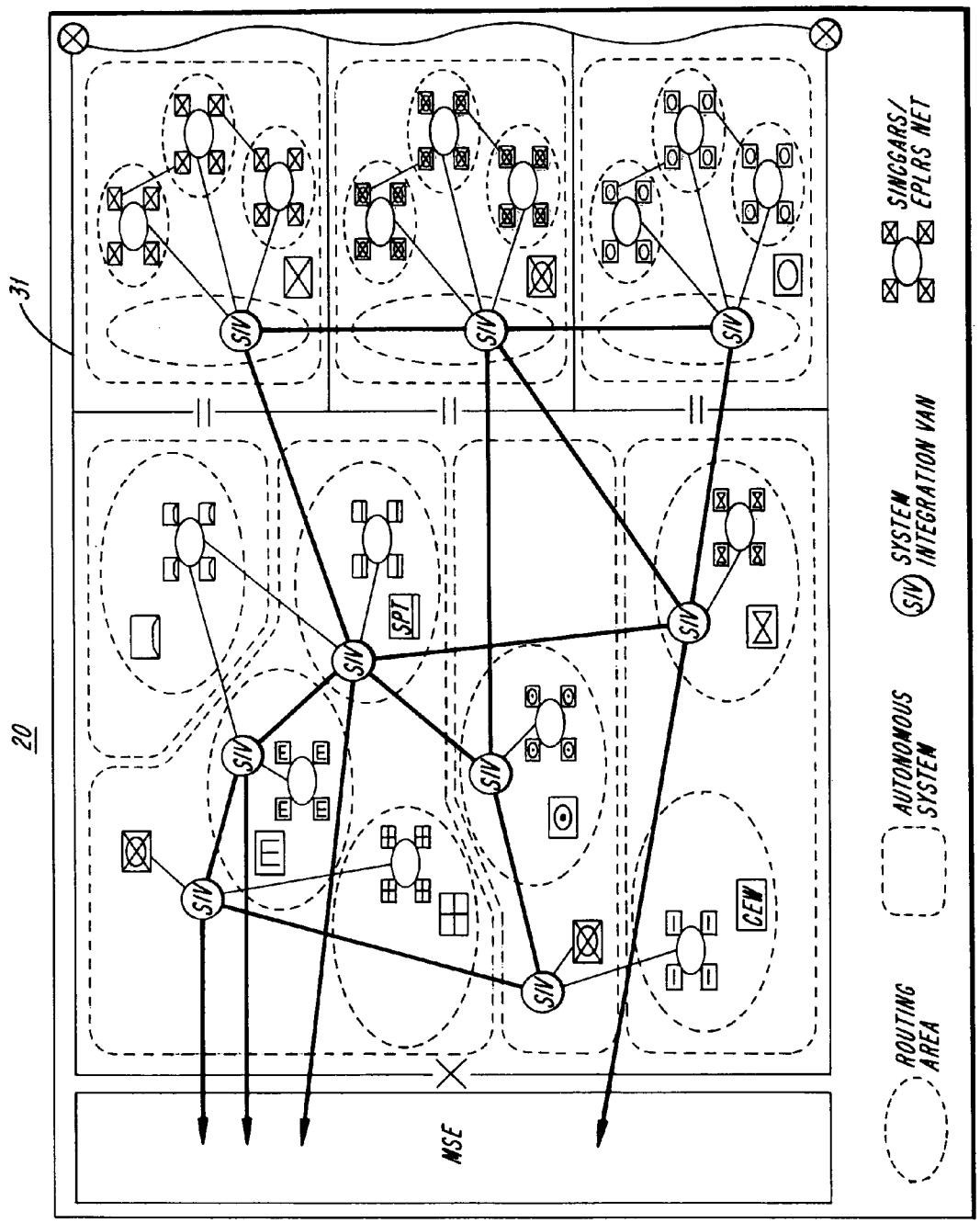
FIG. 3 is a block diagram that illustrates the area of operations of an Army division having three brigades.

The tactical communications grid 20 resulting from the integration of the SINCGARS end-user radio 29 and its associated networks 30 onto the EPLRS 21 backbone architecture is illustrated in more detail in FIG. 3. FIG. 3 is a schematic diagram of the area of operations 31 of an Army division. The value of the communications grid 20 that results from this integration is obvious through the dense population of end-user devices when compared to the initial skeletal EPRLS 21 framework originally illustrated in FIG. 2. Additionally, as the NCS possesses the inherent capability to identify EPLRS radio locations (and hence the position of friendly forces) a supplemental benefit of Situation Assessment (SA) is achieved. When this Situation Assessment "picture" is extended to either rotary or fixed-wing aircraft via the Tactical Internet (through, in essence, an airborne EPLRS) radio the communications link is referred to as the Situation Assessment Data Link (SADL). The present invention, therefore, embraces the SADL link as well. Network management of the Tactical Internet is accomplished through the EPLRS 21 Net Control Station 33. In the field, the NCS 33 operators serve as the technical controller of their EPLRS communities 36 and represent the direct interface between the users and the system. In principal, the effectiveness of each NCS 33 is based on receiving an accurate and timely status from each of the controlled NCS's 33. Among the data provided is system monitor data and advisory counts. It is this data, from the NCS's 33 that manage the communications grid 20. This data is also of primary significance for detecting intrusions of the Tactical Internet.

The present invention provides a strategy for detecting intrusions in the wireless environment such as the Tactical Internet. The present invention is based on innovative applications of information analysis methodologies as well as other information combining and correlating techniques. In order to detect intrusions in any environment, it is important to understand the normal spectrum of behavior so that deviations can be detected and analyzed. For the Tactical Internet, this process requires empirical knowledge about how the SINCGARS radios 29 and EPLRS radios 34 work together as components of the Tactical Internet, and how this grid network is utilized and managed. Once "normal" behavior has been characterized "anomalous" behavior can be identified and utilized as the basis for initiating appropriate adaptive responses.

In the present invention, there is a recognition that the existing EPLRS 21 network control station 33 plays an instrumental role in identifying anomalous network activity through utilization of its existing operational alert indicators. In the prior art, operational program alert conditions, which in essence represent quality of service or other performance thresholds, are already established such that the existing NCS 33 is gathering some anomalous data information. This information previously existed only at the NCS 33 and was not exportable for correlation between or among other NCS's 33. These event logs are faxed to the SYSCON level in order that operational performance problems may be resolved. The prior art failed to consider the concept of investigating these records for indications and warnings of adversary jamming and/or hostile intrusions.

RF Based Tactical Data Links

Figure 4:
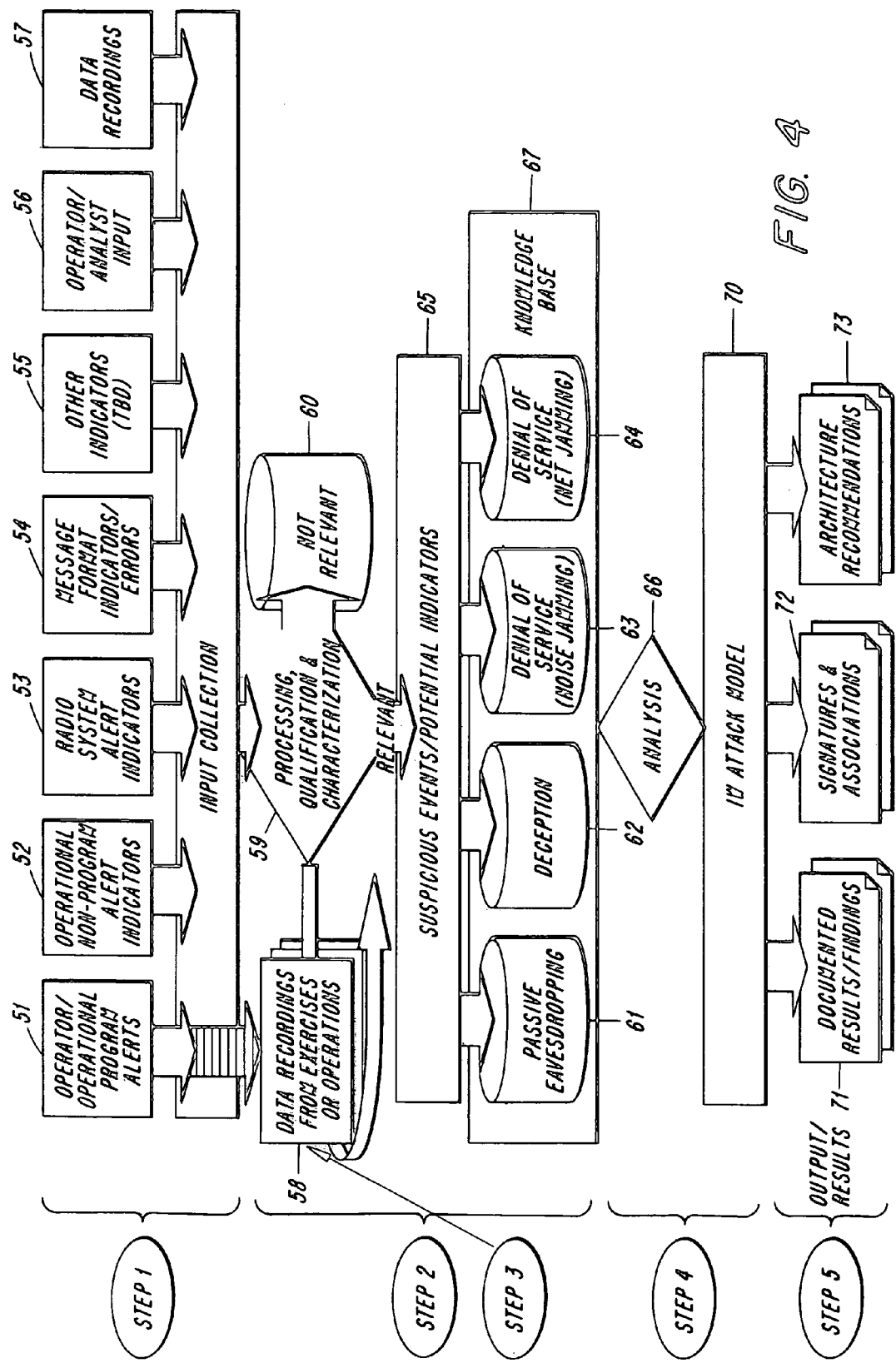
FIG. 4 is a flow diagram of the methodology of the present invention.

The present invention and method of FIG. 4 is also applicable to a RF based tactical data link that will now be explained in more specific detail. Two existing common RF based tactical data links that the present invention can be applied to are the Link-11 and Link-16 tactical data links. The present invention is also specifically applicable to evolving extensions to both of these existing datalinks to include the NATO Improved Link Eleven (NILE) link (which is also commonly referred to as Link-22) as well as to evolutionary extensions of Link-16 designed to address such issues as dynamic network management, higher throughput levels and improved response time (latency).

Link-11 (also known as TADIL A in the US) employs netted communication techniques using standard message formats. Data is exchanged using the Conventional Link Eleven Waveform (CLEW) over a differential quadrature phase-shift keying modulated data link operating at a rate of 1364 (HF/UHF) or 2250 (UHF) bits per second ("bps"). Since this former is susceptible to ECM, an addition has been the Single tone Link Eleven Waveform ("SLEW"), which disburses data bit errors uniformly utilizing data interleaving and employs Full Tail Biting Convolutional Block ("FTBCB") encoding. This greater ECM resistance provides a data rate of 1800 bps. Link-11 is designed for operation on High Frequency ("HF") ground wave and thus has a beyond line of sight ("BLOS") capability to a theoretical range of approximately 300 nautical miles ("NM"). Link-11 can also operate in the UHF band but is then limited to LOS ranges of approximately 25 NM surface-to-surface or 150 NM surface-to-air. Units which exchange data via Link-11 are designated Participating Units ("PUs") or Forwarding Participating Units ("FPUs"). Link-11 is based on 1960s technology and is a relatively slow link that normally operates on a polling system with a net control station polling each participant in turn for their data. In addition to this "Roll Call" mode, Link-11 may be operated in broadcast modes in which a single data transmission or a series of single transmissions is made by one participant. Link-11 is, therefore, a half-duplex link. Link-11 is secure but not ECM-resistant. Link-11 supports the exchange of air, surface and subsurface tracks, EW data and limited command data among C2 units, but it does not support aircraft control nor other warfare areas.

Link-16 uses the principle of Time Division Multiple Access (TDMA), an automatic function of the JTIDS terminal. The TDMA architecture uses time interlacing to provide multiple and apparently simultaneous communications nets. All JTIDS Units, or JUs, are preassigned sets of time slots in which to transmit their data and in which to receive data from other units. Multiple nets can be "stacked" by allowing time slots to be used redundantly, with the data transmitted in each net on different frequencies. There are 51 frequencies available for JTIDS transmissions. The frequency is not held constant during the time slot but is changed rapidly (every 13 microseconds) according to a predetermined pseudo-random pattern. This technique is called frequency hopping. Each net is assigned a number which designates a particular hopping pattern. Link-16 is the tactical data link of choice for the Department of Defense. Link-16 does not significantly change the basic concepts of tactical data link information exchange supported for many years by Link-11 and Link-4A (to support the Command, Control, Communications, and Intelligence function in multi-service and Navy battle group operations). Rather, Link-16 provides technical and operational improvements to existing tactical data link capabilities.

The present invention, as applied to RF based tactical data links such as Link-11 and Link-16 (and their logical extensions), also includes the identification and documentation of errant or seemingly anomalous behavior sets (e.g. network events that negatively impact performance of the network) occurring on the wireless communications grid. Such events, which are typically assumed to occur as a consequence of atmospheric conditions, equipment malfunction, equipment misconfiguration, equipment failure, operator error, or formatting errors, may be found to represent manifestations of hostile intrusion events to include radio electronic combat.

Methodology

Referring now to FIG. 4, a flow diagram depicts the methodology of the present invention. The methodology identifies anomalous network activity through utilization of its existing operator/operational alert indicators as well as other indicators. The invention includes five steps.

Input Collection—Step 1

In the present invention, there is an input collection step 50, since it is first necessary to identify and collect the previously defined operator/operational program alert messages 51 as well as the other types of potential hostile event indicators (to include visual displays and other representations of technical data articulating network performance statistics or error oriented messages). These other potential hostile event indicators may include operational non-program alerts at the network level 52, individual radio set alerts 53, Message Format indicators/errors including, but not limited to, Variable Message Format (VMF) as well as J-Series messages (Link-16), M-Series messages (Link-11), F & JF Series messages (Link-22) 54, other (e.g. EPLRS) message format errors 55, and operator/analyst inputs 56. Another source of input is data recordings 57 employed to establish the basis for normal usage, temporal patterns, or for after action review. These records 57 may yield indications and warnings of adversary jamming and/or hostile intrusions. This data and indicators 51–57 yield a knowledge base of anomalous network activity that forms the foundation for classifying potentially suspicious behavior.

Processing, Qualification and Characterization—Steps 2 & 3

Real-world network control station alerts, or network monitoring and network management alert records 58 from either exercise scenarios or actual operation are identified and collected and may be used to augment the indicators and data 51–57. The input collection 50 is then processed, qualified, and characterized in step 59 and irrelevant data is discarded as not relevant in step 60. The collected data is then evaluated alert-by-alert to determine relevance to the mission of detecting jamming and intrusive events. If determined to be relevant the data is "binned" by the alert characterization type as suspicious events/potential indicators 65. For example, these alert characterizations for hostile events may include passive eavesdropping 61, deception 62 or denial of service (noise jamming) 63, or denial of service (net jamming) 64. The following Table 1 summarizes these hostile events, the associated hostile intent and the potential manifestation.

TABLE 1

| Hostile Event | Hostile Intent | Potential Manifestation |
| --- | --- | --- |
| Jamming (noise jamming) | Disruption/denial of service | Noise/Loss of communications services Appearance of poor signal quality or poor throughput levels |
| Jamming (Net jamming/denial of service) | Negatively impact the performance of the network | Appearance of unusually high traffic levels or poor throughput level Duplicate participants Appearance of rogue units |
| Compromise (Passive eavesdropping) | Masquerade as a legitimate network participant to learn information | Duplicate participants Appearance of rogue units Excessive/improper OTARS Synchronization problems Cryptoseal failures |
| Compromise (Deception-Active transmissions) | Transmit misleading/incorrect information | Appearance of higher traffic levels (vs. profile) Faulty header structure Incorrectly formatted data Negative acknowledgments Cryptoseal failures |

Knowledge of these hostile events and their potential manifestation is useful for detecting intrusions in the tactical communications grid 20.

The present invention seeks to establish a wireless IW Attack Model 70 that results from the four classes of hostile events which are compiled into a knowledge base 67. In FIG. 4, the first threat class is the passive monitoring, wherein an adversary "listens in" to learn information or what is also referred to as passive eavesdropping 61. The second class is deception 62, wherein an adversary masks his identity and pretends to be a "friendly" participant on the net, with the potential to corrupt data on the link with false information ("spoofing"). The third and fourth classes include denial of service attacks 63, 64 composed of two different types. The first denial of service attack 63 is the adversary noise jamming a link including by traditional radio electronic combat means, and the second denial of service attack 64 is adversary network jamming a link (or "spamming" a link) with an overabundance of message traffic with the intent of disrupting service to the link or hindering performance of the link. It should be noted the threats of passive eavesdropping 61, deception 62, and denial of service (net jamming) 64 are made possible by battlefield-overrun situations in which radios are lost and/or captured in battle, compromised by traitors, or undermined by other espionage, intelligence gathering or code breaking techniques.

Hostile jamming events 63 are categorized into the two most commonly encountered types, obvious and subtle. Subtle jamming is not readily recognized as no sound is heard through the receivers and everything appears normal to the radio operator. This type of jamming is made possible as the SINCGARS radios 29 lock onto the strongest carrier signal received and eliminate the reception of all other signals. Known as "Squelch Jamming", this particular adversary technique blocks out the radio=s ability to receive a friendly transmission without the operator being aware that anything has happened.

Step 3 of the present invention also allows for the insertion of actual message traffic/alerts 51 whenever possible. For example, if a "LOW THRUPUT" operational program alert indicator 51 is generated when throughput drops by twenty percent or more in thirty seconds, or from above 50 percent to below 50 percent, then this may be indicative of a system experiencing a jamming transient and will be "binned" under a potential jamming indicator 63 or 64.

Association, Correlation and Fusion Analysis—Steps 4 & 5

The process of producing a global description of the wireless network state involves the techniques of correlation, association, fusion and tracking. Correlation of events is typically done when sets of events either are known to have no a-priori relationships or are known to have unknown relationships, yet occur in a regular pattern. Correlation usually takes place where a high volume of low sophistication data are present. An example of events that are suitable for correlation are the presence of poor signal to noise ratio when a gasoline-powered jeep (a primitive spark-gap radio transmitter) drives by an amplitude modulated radio receiver. The events are related, but the proximity of the jeep to the receiver is unknown to the system.

Association of events is a technique used when the events in question have a relationship that is tangible and derivable. In the above example, the presence of the jeep and the radio noise are related by time, especially if the pair of events is periodic. Knowing the relationship in time permits association of these two events, leading to causal and temporal dependencies.

Accordingly, the knowledge base 67 is evaluated to determine if associations are discernible between alertsCagain on an alert-by-alert basisCthat may contribute towards the formulation of an opinion about the significance of the event. Again, the alert is characterized by type. The intent of the present invention is to comprehend how these events unfold in operation, and to establish a credible basis for correlating alerts to each other so that patterns of events may be detected and interpreted. Significant additional benefit is gained if events are correlated across more than one network control station 33 for the period (epoch) of time.

In step 4, using algorithms and processes an analysis 65 is performed, and this newly formed knowledge base is mined to discern and classify intrusion and denial of service events (and patterns of events which, when correlated, represent 'signatures') and to represent them through visualization techniques and reports as a component of an overall IW attack model. More specifically, the analysis step 65 results in the generation of documented results/findings 71, signatures and associations 72, and architecture recommendations 73.

The knowledge of suspicious events indicators 65 and the formulation of the IW Attack Model 70, can be used to create an event database architecture that will enhance the manual processes for reporting network behavior to the SYSCON. This knowledge can also be used to enhance the survivability of next-generation digital radios. As mentioned above, the database may also be populated with data from paper archives or actual field exercises in step 58 and employ programmatic means to evaluate associations towards the detection of intrusion and jamming events in real-time/near real-time.

In Step 5, the IW attack model 70 is utilized to generate output/results that can minimize the effects of an ongoing intrusion or minimize the effects of a future intrusion. Documented results/findings 71 are generated from the IW attack model 70. The IW attack model also allows signatures and associations 72 to be generated, and these signatures and associations are instrumental in handling ongoing and future intrusions. The IW attack model can also be useful in formulating architecture recommendations 73 that can be used to upgrade existing equipment or in the design of future equipment.

The model of FIG. 4 provides a viable approach for detecting hostile intrusions of a tactical data link, the Tactical Internet, or of forecasting intrusions into a wireless Internet Protocol environment. The key to detecting intrusions in any wireless information grid is to have a firm comprehension of the composition of normal traffic and to leverage the significance of "anomalous" events by correlating them to other events occurring on the network.

In FIG. 4, the methodology of the present invention requires an identification of various potential indicators. Table 2 below lists the various Link-16 potential indicators and the corresponding Link-11 potential indicators.

TABLE 2

Link-16 To Link-11 Comparison

| Link-16 Potential Indicators | Link-11 Potential Indicators |
|---|---|
| RF Fingerprinting | Hi/low frequency roll-off, too short reports |
| Source Location | PU address, time to respond (TOA) |
| Traffic Load v. Profile | NCT, frame count, % good throughput |
| Cryptoseal Failures | KG alarm, MI frame errors |
| Excessive NAKS | PU/PUs not responding, long NCT |
| Faulty Header Structure | Message format errors, preamble, control codes |
| Unexpected OTAR | |
| Old Messages | |
| Traditional IP Attacks | |
| Rise in Level of Erasures | BER, SNR, audio, net busy, missed xmits, RQ |
| Decode Failures | Rcv data errors, control code errors |
| False Synchronizations | |
| Rogue Units | Dual NCS, duplicated PUs, requency errors |
| Dual Assignments | Dual NCS |
| Bogus Formats | Control code errors, PU/NCS w/no data |

As regards RF based intrusions, the present invention is based upon the assumption that intrusive threats manifest themselves in many forms. As described above in connection with FIG. 4, the threats include passive eavesdropping 61, deception 62, and denial of service attacks 63, 64. The range of hostile events for intrusion in a RF based communications links have been summarized into Table 3 below, and where applicable, have indicated the Internet attack equivalent. It should be noted that in more cases than not, there is no Internet equivalent. This is due to the unique way in which RF data is packaged for transmission; the processes of RF transmission protocols and encrypted session "handshaking", the inherent susceptibility of RF communications to electronic jamming and performance range limitations which are defined by the Federal Communications Commission.

capable of displaying the manifestation of the anomalous event. Furthermore, the present invention uniquely associates these manifestations with the hostile intent (see Table 4, below).

TABLE 3

RF Attack Model

| Hostile Event | Hostile Intent | Potential Manifestation | Internet Equivalent |
|---|---|---|---|
| Jamming (noise jamming) | Disruption/ denial of service | Noise/Loss of communications services | — |
| Jamming (Net jamming/denial of service) | Negatively impact the performance of the network | Appearance of unusually high traffic levels | Spam attack |
| | | Duplicate participants | — |
| | | Appearance of rogue units | Masquerade attack |
| Compromise (Passive eavesdropping) | Masquerade as a legitimate network participant to learn information | Duplicate participants | Masquerade attack |
| | | Appearance of rogue units | Masquerade attack |
| | | Excessive OTARS | — |
| | | False synchronizations | — |
| | | Cryptoseal failures | — |
| Compromise (Deception-Active transmissions) | Transmit misleading/ incorrect information | Appearance of higher traffic levels (vs. profile) | Hacking (in general) |
| | | Faulty header structure | — |
| | | Incorrectly formatted data | — |
| | | Negative acknowledgements | — |
| | | Cryptoseal failures | — |

Regardless of the methodology employed by the attacker, the intent of these attacks is Ahostile@ in that they are intended to gather intelligence (inclusive of business intelligence or economic espionage activities), disrupt normal communications, alter information so as to misrepresent the known truth, or to transmit false information or to serve as the media for attacks against computers. The use of the term Ahostile@ has precedence in the context of commercial applications through the acknowledgment of Ahostile@ applets that are malicious in nature.

In the present invention, the term "RF Communications Links", refers to data communications networks that are effected through the movement of both formatted and free-form message sets through radio transmission in any spectrum (i.e., High Frequency, Ultra High Frequency) and by any means (to include spread spectrum and frequency agile techniques). The intent is to build a netted communications architecture and to employ standard message formats toward the exchange of digital information among airborne, land based, and shipboard data systems. There are many different equipment configurations for each type of data link. Typically, these configurations consist of a computer system, an encryption device, a data coupler set, a radio, and an antenna.

With respect to RF based communications links, the present invention specifically provides certain advantages. In Table 3 a RF attack model identifies and defines a range of hostile RF communications events to include: electronic jamming, passive eavesdropping, denial of service attacks and deceptive attacks. Anomalous behavior is defined through the establishment of temporal and user patterns, and anomalous behavior plays a unique role in the construction of the RF attack model. This RF attack model is unique, and there is no existing methodology to detect this range of intrusive events in the RF spectrum. These anomalous events may be discreetly identified through the employment of RF network management tools. Such tools are capable of

TABLE 4

Potential Indicators of Intrusive Events

| Hostile Event | Potential Manifestation | Intent Indicator |
|---|---|---|
| Jamming (noise jamming) | Noise/Loss of communications services | Examination of the communications signal itself. In particular the presence of jamming noise is indicated by a rise in Reed-Solomon erasures. If these erasures are sudden, and not associated with the performance of the relay or other friendly participants then the event may be construed as intentful |
| Jamming (Net jamming/denial of service) | Appearance of unusually high traffic levels | Utilization of assigned and/or historic traffic profiles to current levels to ascertain deviations from expected norms |
| | Duplicate participants | The appearance of more than participant with the same identification number |
| | Appearance of rogue units | The appearance of a participant that has not been previously defined/declared |
| Compromise (Passive eavesdropping) | Duplicate participants | The appearance of more than participant with the same identification number |
| | Rogue units | The appearance of a participant that has not been previously defined/declared |
| | Excessive Over The Air Rekey requests (OTARS) | Appearance indicates a unit trying to "break into" an established network |
| | False synchronizations | Appearance indicates a unit trying to "break into" an established network |
| | Cryptoseal failures | Appearance indicates an improperly keyed unit trying to "break into" an established network |
| Compromise (Deception-Active transmissions) | Appearance of higher traffic levels (vs. profile) | Appearance potentially indicates an adversary denial of service attack, or an attack designed to negatively impact performance of the network |
| | Faulty header structure | Potentially indicates a hostile transmission wherein the attacker has not properly constructed the transmission header |
| | Incorrectly formatted data | Potentially indicates a hostile transmission wherein the attacker has improperly formatted the data for transmission |
| | Negative acknowledgments | Indicates that a unit has dropped out of the communications network, or that a fictitious unit has been configured into the network with the intent of degrading network performance |
| | Cryptoseal failures | Appearance indicates an improperly keyed unit trying to "break into" an established network |

It should be noted that the physical manifestation of these events differs across the varying RF communications links (e.g. there is no common standard or format; each is different). (See Table 2 (above) for a Link-16 to Link-11 representative comparison.) Lastly, through the use of information combining technologies (such as Neural Nets and Fuzzy Logic) the association of seemingly unrelated anomalous events across time and geographic location (time and space)

may be correlated to each other yielding a mathematical conclusion that indeed these events are likely to represent attacking events (intrusions).

Recovery

Recovery, in the context of the Tactical Internet or a RF based tactical data link, implies the ability to continuously sustain the wireless communications grid. This implies that in the face of an Information Warfare attack fall control of the wireless grid can be retained. Recovery, in this context, becomes a combination of events, both manual and automatic, that have the effect of returning full control and authority of the grid back to friendly forces. The approach of the present invention to wireless communications resiliency centers on the vision that wireless networks should possess the ability to adaptively respond to the IW attack through operational recovery of the system. The key is to provide the means to build an intrusion tolerant system, where the system maintains operational continuity in face of an IW attack and can simultaneously affect real time information recovery Certainly, the individual radio sets (such as the SINCGARS radio) possess inherently sophisticated processes and algorithms that facilitate programmatic retransmission attempts (over varying frequencies) until the message is successfully sent. This process, however, falls short in the presence of high-power noise jamming across the total available bandwidth of the radio transmitter or when a SINCGARS radio has been lost to hostile forces and it is no longer of any r advantage to transmit across this radio.

For continuity of operations, it is be beneficial to identify other tactically deployed radio assets capable of gaining access to the theater communications grid through totally different signal carriers (e.g., SATCOM). This component of operational recovery includes an inventory of the available radios and carriers in a cross-reference chart as an initial means of evaluating the feasibility of utilizing alternate carriers in the event of intrusion detection. The next step is to identify which radios are capable of cross communicating (initially through manual intervention) so these communications architecture alternatives may be implemented.

Upon determination that a radio has been lost to an adversary, it is prudent to identify the range of potential actions related to specific unit disabling that our forces could take. These potential actions (Courses of Action or "COAs") define the initial steps in the recovery process. These COAs may include employment of tactical deception to mislead the adversary or disabling the radio to prevent compromise of friendly communications. Criteria to assist in the decision to disable captured radios can include using the geo-fixing capabilities of EPLRS. For example, criteria that compare the EPLRS location to known enemy boundaries could be used. If a piece of equipment indicates that it is within the known enemy area, then that captured unit of equipment can be removed from the tactical communications grid before it can engage in malicious activity.

In summary, the present invention includes 1) researching, identifying and investigating all potential sources of information (including user pattern and temporal data) that will lead to the detection and classification of potentially intrusive events; 2) establishing a knowledge base (database) of anomalous network activity that will form the foundation for classifying potentially suspicious behavior; 3) augmenting this research through the collection of real-world control station alert records from either exercise scenarios or actual operation; 4) analyzing and evaluating this database to determine relevance by attack type; 5) creating an IW Attack Model; 6) describing detected signatures and making recommendations for network/event management capabilities that must either be maintained or developed throughout the development process to enhance the survivability of next generation digital radios; and 7) developing a recovery model that includes information reconstitution, system continuity, and an additional method to handle the problem of captured equipment.

The invention claimed is:

1. A method for detecting intrusions in a wireless network, comprising the steps of:

researching and defining normal network behavior with the intent of ascertaining user and temporal patterns;

researching potential sources of information that will lead to the detection and classification of potentially intrusive events;

establishing a knowledge base of anomalous network activity that will form the foundation for classifying potentially intrusive events;

analyzing and evaluating the knowledge base to create an attack model;

utilizing the attack model to provide an adaptive response to intrusions in the wireless network; and developing a recovery model to recover from an intrusion of the wireless network.

2. A method according to claim 1 which further includes augmenting the researching step by collecting real-world information concerning intrusive events and updating the knowledge base.

3. A method according to claim 1 wherein the wireless network is the Tactical Internet.

4. A method according to claim 1 wherein the wireless network is a Situation Assessment Data Link (SADL).

5. A method according to claim 1 wherein the wireless network is a tactical data link.

6. A method according to claim 5 wherein the tactical data link is a Link-16 type tactical data link and its logical extensions.

7. A method according to claim 5 wherein the tactical data link is a Link-11 type tactical data link and its logical extensions.

8. A method according to claim 5 wherein the tactical data link is a Link-22 type tactical data link.

9. A method according to claim 1 wherein the knowledge base includes data relating to suspicious events including passive eavesdropping, deception and denial of service.

10. A method according to claim 7 wherein the attack model is utilized to generate signatures of suspicious events.

11. A method according to claim 7 wherein the attack model is utilized to generate recommendations regarding the design of a wireless network.

12. A method for detecting intrusions in a wireless network, comprising the steps of:

researching and defining normal network behavior with the intent of ascertaining user and temporal patterns;

researching potential sources of information that will lead to the detection and classification of potentially intrusive events;

augmenting the researching step by collecting real-world information concerning intrusive events and updating the knowledge base;

establishing a knowledge base of anomalous network activity that will form the foundation for classifying potentially intrusive events;

analyzing and evaluating the knowledge base to create an attack model;

utilizing the attack model to provide an adaptive response to intrusions in the wireless network; and developing a recovery model to recover from an intrusion of the wireless network.

13. A method for detecting intrusions in the Tactical Internet, comprising the steps of:
researching and defining normal network behavior with the intent of ascertaining user and temporal patterns;
researching potential sources of information that will lead to the detection and classification of potentially intrusive events;
establishing a knowledge base of anomalous network activity that will form the foundation for classifying potentially intrusive events, wherein the knowledge base includes data relating to suspicious events including passive eavesdropping, deception and denial of service;
augmenting the researching step by collecting real-world information concerning intrusive events and updating the knowledge base;
analyzing and evaluating the knowledge base to create an IW attack model;
utilizing the IW attack model to provide an adaptive response to intrusions in the Tactical Internet; and
developing a recovery model to recover from an intrusion of the Tactical Internet.

14. A method for detecting intrusions in a RF based tactical data link, comprising the steps of:
researching and defining normal network behavior with the intent of ascertaining user and temporal patterns;
researching potential sources of information that will lead to the detection and classification of potentially intrusive events;
establishing a knowledge base of anomalous network activity that will form the foundation for classifying potentially intrusive events, wherein the knowledge base includes data relating to suspicious events including passive eavesdropping, deception and denial of service;
augmenting the researching step by collecting real-world information concerning intrusive events and updating the knowledge base;
analyzing and evaluating the knowledge base to create an IW attack model;
utilizing the IW attack model to provide an adaptive response to intrusions in the RF based tactical data link; and
developing a recovery model to recover from an intrusion of the RF based tactical data link.

15. The method of claim 1, wherein said attack model comprises an identification of a plurality of types of hostile events and associated manifestations of anomalous network events.

16. The method of claim 1 further including the steps of generating signatures from said attack model.

17. The method of claim 1, wherein said wireless network is an RF radio communication system.

18. The method of claim 1, wherein said anomolous network activity comprises network performance data.

19. A method for detecting intrusions in a wireless network, comprising the steps of:
researching and defining normal network behavior with the intent of ascertaining user and temporal patterns;
researching potential sources of information that will lead to the detection and classification of potentially intrusive events;
establishing a knowledge base of anomalous network activity, comprising network performance data that includes noise, loss of service, signal quality and traffic levels;
analyzing and evaluating the knowledge base to create an attack model; and
utilizing the attack model to provide an adaptive response to intrusions in the wireless network.

20. A method for detecting intrusions in a RF-based radio communication system, comprising the steps of:
establishing a knowledge base of anomalous activity for classifying potentially intrusive events, wherein the knowledge base includes data relating to suspicious events including passive eavesdropping, deception and denial of service;
analyzing and evaluating the knowledge base to create an attack model that comprises an identification of a plurality of types of hostile events and associated manifestations of anamolous network events;
utilizing the attack model to provide an adaptive response to intrusions in the RF-based radio communication system; and
developing a recovery model to recover from an intrusion of the RE-based radio communication system.

21. The method of claim 20 further including the steps of generating signatures from said attack model.

22. The method of claim 20, wherein said anomolous activity comprises performance data.

23. The method of claim 22, wherein said performance data includes noise, loss of service, signal quality and traffic levels.

* * * * *